ELECTRONIC FUNCTION GENERATOR WITH INTERPOLATING RESISTORS

Original Filed Sept. 2, 1959 2 Sheets-Sheet 1

INVENTOR.
AMOS NATHAN

BY Ostrolenk, Faber, Gerb & Soffen
ATTORNEYS

ELECTRONIC FUNCTION GENERATOR WITH INTERPOLATING RESISTORS

Original Filed Sept. 2, 1959 2 Sheets-Sheet 2

INVENTOR.
AMOS NATHAN
BY Ostrolenk, Faber, Gerb & Soffen
ATTORNEYS

United States Patent Office

Re. 26,029
Reissued May 24, 1966

26,029
ELECTRONIC FUNCTION GENERATOR WITH INTERPOLATING RESISTORS

Amos Nathan, 17 Lamed Heh Ave., Haifa, Israel

Original No. 3,106,639, dated Oct. 8, 1963, Ser. No. 837,617, Sept. 2, 1959. Application for reissue Sept. 17, 1965, Ser. No. 490,166
11 Claims. (Cl. 235—197)

Matter enclosed in heavy brackets [ ] appears in the original patent but forms no part of this reissue specification; matter printed in italics indicates the additions made by reissue.

This invention relates to means for generating a function of one or more variables wherein the input variables and the value of the function are represented in the form of electric potentials. More specifically, this invention pertains to the case in which said means include a plurality of interpolating resistance means.

In the field of analog computers, for example, it is frequently required to generate a function of one or more variables such that the value of the function is obtained practically instantaneously. It is then often convenient to approximate said function by a piecewise-linear approximation with the aid of a plurality of diode selecting means. The simple common configurations implementing such a function generator require approximately one diode per linear region of the approximation and a great number of diode means and associated circuits is frequently required to obtain a function with the prescribed accuracy.

If said function is approximated by a piecewise-linear approximation, the errors of approximation are particularly pronounced at the transitions from one linear piece to another, i.e. at the corners or edges of the curve or surface or hyperface representing said piecewise-linear approximation. It would thus be advantageous to round off these corners or edges, and thus to provide an approximation which is better than the piecewise-linear approximation.

[It is an object of this invention to provide a simple novel configuration of such a function generator in which additional linear regions can be generated, as compared with the simple common configurations, without the use of additional diodes.]

[It is therefore an object of this invention to provide a simple new configuration of a diode function generator which requires fewer diodes for the generation of a given piecewise-linear function than the simple configurations of the prior art.]

It is [yet another] *an* object of this invention to provide means for the production of a [piecewise-linear or a] non-linear approximation to a concave function.

[Still] Another purpose of this invention is the modification of a piecewise-linear electronic function generator [with interpolating resistors] into a non-linear function generator with the aid of non-linear resistors.

Other objects and advantages of the invention will become apparent from the following description, taken in conjunction with the accompanying drawings, in which FIGURE 1 is a schematic diagram of a conventional diode function generator for the production of concave functions;

Figure 1:
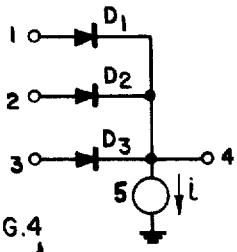
Figure 2:
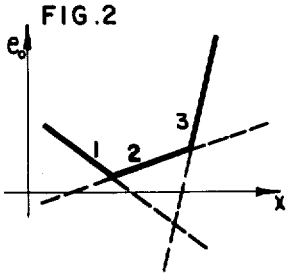
FIGURE 2 is a plot of the output of the circuit of FIGURE 1.

FIGURE 1 represents a conventional diode selection circuit selecting as output signal the largest of its input signals, three input signals being provided in this example. 1, 2, 3 are the input terminals which are connected to the anodes of diodes $D_1$, $D_2$, $D_3$, respectively, with common output terminal 4. Current is withdrawn from 4 by current generator 5. As only one diode can conduct at a time, the output voltage at terminal 4 is equal to the input voltage at the input terminal of the conducting diode. If, for example, the three input signals are linearly dependent upon a parameter x, the plot of input voltages versus x is represented by three straight lines 1, 2, 3, respectively, corresponding to the three inputs, as shown in FIGURE 2. Output signal $e_o$ at 4 is therefore represented by the concave curve which is drawn in solid lines in FIGURE 2.

Figure 3:
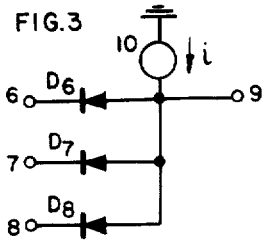
FIGURE 3 is a schematic diagram of a conventional diode function generator for the production of convex functions.

Similarly, FIGURE 3 is a schematic diagram of a function generator for convex functions. 6, 7, 8 are the input terminals to which the cathodes of diodes $D_6$, $D_7$, $D_8$, respectively, are connected. These diodes have a common connection at output terminal 9 into which current i is injected by current generator 10. Only one diode can conduct at a time and output signal $e_o$ at terminal 9 is equal to the smaller of the input signals.

Figure 4:
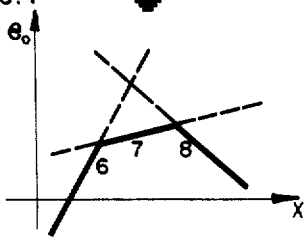
FIGURE 4 is a plot of the output of the circuit of FIGURE 3.

FIGURE 4 is a plot of output signal versus a parameter x, for the case in which all three input signals are linear functions of x. The circuit of FIGURE 3 is seen to be suitable for the generation of convex functions.

In general, if the input signals in the circuits of FIGURES 1 and 3 are linear functions of one or more variables, the output signal will consist of a piecewise linear function of these variables and the number of the linear pieces of the output signal will not exceed the number of diodes used in the circuit.

It is well-known how functions that are not wholly concave or wholly convex can be generated by combinations of circuits such as those corresponding to FIGURES 1 and 3. Moreover, the inputs may be non-linear functions of some parameters. In any case, the output signal of a function generator embodying these circuits will be equal to one of the input signals, selection being switched from one input signal to another according to the values of these signals and according to the configuration used. These considerations neglect possible offset voltages due to such causes as diode voltage drops, such offset voltages being readily compensated for.

This invention provides resistance means in series with the input selecting diode means in a circuit for the generation of a function, such that, in addition to the states of the circuit in which only one diode conducts, the circuit may be in states in which two or more diodes conduct simultaneously. Said resistance means will be called interpolating resistors.

One embodiment of a function generator of this invention will be described in connection with FIGURE 5 in which 1, 2, 3, are the input terminals which receive the input signals in the form of potentials. Resistance means $r_1$, $r_2$, $r_3$ are connected to terminals 1, 2, 3, and to the anodes of diodes $D_1$, $D_2$, $D_3$, respectively. These diodes have a common connection at output terminal 4 from which current i is withdrawn by current generator 5. This embodiment is identical to the embodiment of the prior art according to FIGURE 1, except for the added interpolating resistance means $r_1$, $r_2$, and $r_3$.

Denoting input potentials at 1, 2, 3 by $e_{i1}$, $e_{i2}$, $e_{i3}$, respectively, and the output potential at 4 by $e_o$, we have when only $D_1$ conducts:

$$e_o = e_{i1} - ir_1 \tag{1}$$

when $D_1$ and $D_2$ conduct simultaneously:

$$e_o = \frac{r_2}{r_1+r_2} e_{i1} + \frac{r_1}{r_1+r_2} e_{i2} - \frac{r_1 r_2}{r_1+r_2} i \tag{2}$$

when only $D_2$ conducts:

$$e_o = e_{i2} - ir_2 \tag{3}$$

and similarly for other states of this embodiment. Diode $D_1$ conducts if and only if $$e_o < e_{i1} \tag{4}$$

diode $D_2$ conducts if and only if $$e_o < e_{i2} \tag{5}$$

and similarly for $D_3$. Similar conditions hold in those cases in which more than two diodes conduct simultaneously.

For given input signals it is thus possible to determine which diodes conduct and to determine the output potential $e_o$. When only one diode conducts, $e_o$ is a linear function of its input potential, as follows from (1). When two diodes conduct simultaneously, $e_o$ is a linear combination of the input signals of the conducting diodes, as follows from (2).

Figure 5:
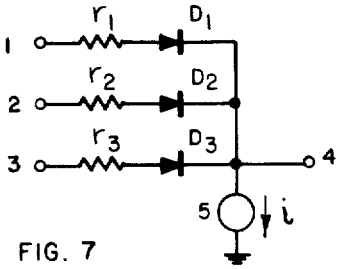
FIGURE 5 is a schematic diagram of one embodiment of a function generator of this invention, incorporating interpolating resistors, for the production of concave functions.
Figure 6:
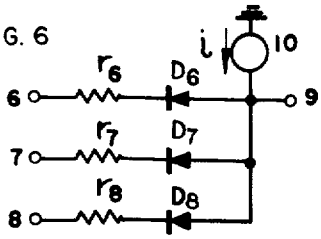
FIGURE 6 is a schematic diagram of one embodiment of a function generator of this invention, incorporating interpolating resistors, for the production of convex functions.

FIGURE 6 is one example of an embodiment of a circuit of this invention for the production of a concave function. In FIGURE 6, terminals 6, 7, 8, $r_6$, $r_7$, $r_8$, $D_6$, $D_7$, $D_8$, 9, 10 correspond respectively to 1, 2, 3, $r_1$, $r_2$, $r_3$, $D_1$, $D_2$, $D_3$, 4, 5, of FIGURE 5, the only difference being the reversal of the diodes and of the direction of current i.

Figure 7:
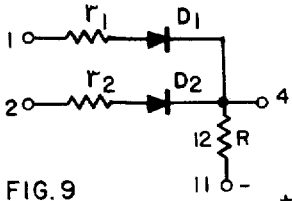
FIGURE 7 illustrates the replacement of current sources by voltage sources and resistors.

The current source of embodiments such as that of FIGURE 5, is replaced in FIGURE 7 by a constant voltage source, at 11, and a resistor 12 of resistance R. Provided R is large with respect to interpolating resistors such as $r_1$, $r_2$, and provided the modulus of the potential at 11 is large with respect to the modulus of the input potentials, Equations 1, 2, 3 apply approximately with $$i = -V/R \tag{6}$$

where V is the constant potential at 11. V is negative in the example of FIGURE 7.

In general it is required that V be smaller than the smallest input potential. The accurate relations corresponding to FIGURE 7, replacing Equations 1, 2, and 3, are as follows:

When only $D_1$ conducts:

$$e_o = \frac{g_1}{g_1+G} e_{i1} - \frac{G}{g_1+G} V \tag{7}$$

When $D_1$ and $D_2$ conduct simultaneously:

$$e_o = \frac{g_1}{g_1+g_2+G} e_{i1} + \frac{g_2}{g_1+g_2+G} e_{i2} - \frac{G}{g_1+g_2+G} V \tag{8}$$

and when only $D_2$ conducts:

$$e_o = \frac{g_2}{g_2+G} e_{i2} - \frac{G}{g_2+G} V \tag{9}$$

where $$g_1 = 1/r_1;\ g_2 = 1/r_2;\ G = 1/R \tag{10}$$

Figure 8:
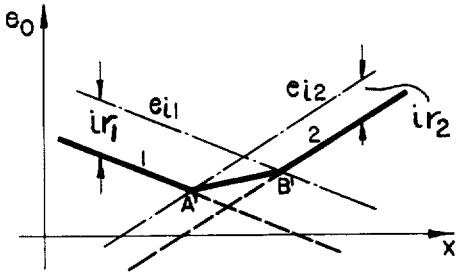
FIGURE 8 is a plot of input and output signals of a one dimensional embodiment of a function generator of this invention for concave functions.

I shall now describe one embodiment of a function generator of this invention producing a piecewise-linear function and using configurations such as those of FIGURES 5, 6, or 7. As an example, the configuration of FIGURE 7 is chosen, and I assume that R, V are such that Equations 1 through 6 may be used. The plot of input and output potentials in FIGURE 8 pertains to this case. Let x be a potential, which will be called the independent variable. $e_{i1}$ and $e_{i2}$, the input potentials, are linear functions of x in this case, and thus represented by straight lines in FIGURE 8. Starting with small x, output voltage $e_o$ at 4 of FIGURE 7, is given by line 1 in FIGURE 8, which is parallel to $e_o$ and $ir_1$ volts below it. Up to point A′ only $D_1$ conducts. At A′, $e_o = e_{i2}$, and $D_2$ begins to conduct. For large x, only $D_2$ conducts and $e_o$ is given by line 2 which is parallel to $e_{i2}$ and $ir_2$ volts below it. At B′, $e_{i1} = e_o$ and thus to the left of B′, $D_1$ conducts, and to the right of B′ it does not conduct. Between A′ and B′ both $D_1$ and $D_2$ conduct, and as Equation 2 shows that $e_o$ must be a linear function of x in this case as well, provided all resistances are constant, which will now be assumed, the straight line A′B′ represents $e_o$ in this region. Increasing x from small values, $e_o$ is seen to move along 1, A′B′, 2, corresponding to the conduction of one, of two and of one diodes, respectively. A′B′ will be called an interpolated segment of $e_o$. In this case $e_o$ is composed of 3 straight lines whereas without interpolating resistors $r_1$, $r_2$, it would consist of only two straight lines.

In general, with more than two diodes, a piecewise-linear one dimensional function generator for wholly convex or wholly concave functions using the above embodiments of this invention is characterized by a plurality of linear input signals and by the alternate conduction of one and two diodes, as the independent variable changes monotonically. A total of n diodes then produces an output signal composed of 2n—1 straight segments.

Functions that are not wholly convex or wholly concave can be produced by well-known methods in combinations of circuits corresponding to FIGURES 1 and 3. Similar methods apply to the circuits of this invention, and the implementation of these in connection with this invention will be quite clear from the above description.

A detailed example using this invention for the case of a function of two variables is described in my invention in "Electronic Multiplier and Function Generator," filing date at U.S. Patent Office, March 24, 1959, Serial No. 801,468.

For example in order to produce a concave function of the two variables x and y having three linear regions, the configuration of FIGURE 7 may be used in which the input signals at 1 and 2 are $$e_{i1} = a_1 x + b_1 y + c_1$$

and $$a_{i2} = a_2 x + b_2 y + c_2$$

respectively, where $a_1$, $b_1$, $c_1$, $a_2$, $b_2$ and $c_2$ are suitable constant voltages. Output voltage $e_o$ is then given by (7), (8) and (9) for the three resulting linear domains, respectively. A linear domain of $e_o$ is here defined as the domain of x and y in which $e_o$ is a linear function of x and y. The use of this invention for more than two variables will be quite clear from the above description.

Figure 9:
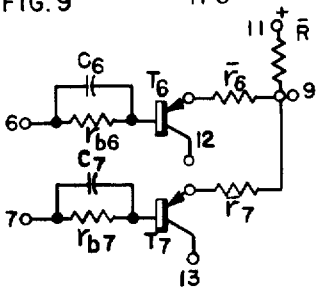
FIGURE 9 is one example of a transistor embodiment of a function generator of this invention for the production of concave functions.
Figure 10:
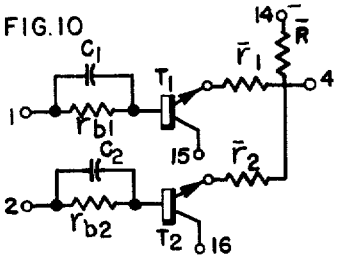
FIGURE 10 is one example of a transistor embodiment of a function generator of this invention for the production of convex functions.

While the diode means used in the above examples of embodiments of this invention are diodes, this is to be understood by way of illustration only. In particular, suitably connected transistors may be used as diode means, as will be described in the following examples of embodiments of this invention, in connection with FIGURES 9 and 10 in which FIGURE 9 corresponds to the diode embodiment of FIGURE 6 (with only two input terminals), and FIGURE 10 corresponds to the diode embodiment of FIGURE 7. In the example of FIGURE 9 the base connection of PNP transistors $T_6$, $T_7$ is fed from input terminals 6 and 7 via base resistors $r_{b6}$ and $r_{b7}$ in parallel with capacitors $C_6$ and $C_7$, respectively. 12 and 13 are the respective collector terminals of $T_6$ and $T_7$ which are held at suitable constant potentials. The emitters of $T_6$ and $T_7$ are joined to resistors $\bar{r}_6$ and $\bar{r}_7$ with common connection at output terminal 9. 9 is connected through resistance means $\bar{R}$ to a constant positive potential $\bar{V}$ at terminal 11. The base connection of the transistors is one example of a standard input circuit into the base of [x] transistors in the so-called "common collector" connection which is used in the circuit of FIGURE 6. $\bar{r}_6$ and $\bar{r}_7$ are the interpolation resistors. $\bar{V}$ and $\bar{R}$ correspond to the current source of FIGURE 6. Similarly, the embodiment of FIGURE 10, using NPN transistors $T_1$ and $T_2$, corresponds to FIGURE 7; $\bar{r}_1$, $\bar{r}_2$, $\bar{R}$ and the negative potential V at terminal 14 corresponding respectively to $r_1$, $r_2$, R and V of FIGURE 7. 15 and 16 are the collector terminals of $T_1$, $T_2$, respectively.

These transistor embodiments of this invention have the additional advantage of providing high input impedance at their input terminals.

In the aforementioned embodiments of this invention the actual potentials at the output terminal of the function generator are not exactly equal to the results predicted by the formulas derived above, because of the voltage drops of the diode means, when conducting. The offset voltages of the output potentials caused by these voltage drops are readily compensated for by adding suitable constant voltages to the input or to the output potentials of the function generator.

Figure 11:
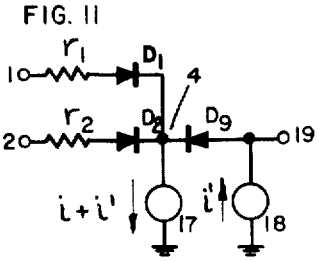
FIGURE 11 is a schematic diagram of one embodiment of a circuit of this invention incorporating diode drift compensation.

One method of compensating the drift due to changes in diode voltage drops during conduction will be described in connection with FIGURE 11. FIGURE 11 corresponds to the embodiment of FIGURE 5 (with only two input circuits). Current generator 5 is replaced by current generator 17 withdrawing current $i+i'$ from terminal 4. Terminal 4 is connected to the cathode of diode $D_9$, whose anode is connected to output terminal 19 which is fed by current generator 18 with current $i'$. Diode $D_9$ therefore always conducts. For example, with equal types of diodes $D_1$, $D_2$ and $D_9$, the choice $i'=i$ yields complete drift compensation when only one of the input diodes conducts and partial compensation when both diodes conduct, because the signal path from any input terminal to output terminal 19 now traverses one diode in the forward and one in the backward direction. A value of $i'$ somewhat smaller than i yields best average compensation. For example, if $r_1=r_2$, $i'=0.75i$ is a suitable value for good drift compensation.

Embodiments of the method of drift compensation in connection with other embodiments of this invention will be quite clear from the above description.

In the above embodiments of this invention it was assumed that said interpolating resistors have constant resistance. In general said resistors may be non-linear. Thus in general $r_m$ is a function of $i_m$, $$r_m=r_m(i_m);\ m=1,\ 2,\ \ldots$$

where $i_m$ is the current flowing through $r_m$. More specifically it will be assumed in this invention that $r_m$ is either constant or a monotonically decreasing function of $i_m$ in the range of values of $i_m$ in which said resistor is used.

Figure 12:
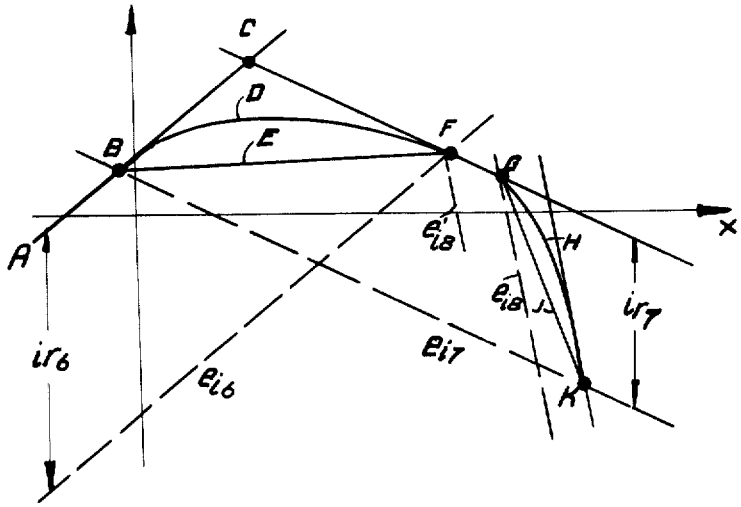
FIGURE 12 is a plot of output signal versus x, for one embodiment of a function generator of this invention embodying non-linear interpolating means, in which the input signals are linear functions of x.

FIGURE 12 is a plot of input and output potentials of one embodiment of this invention corresponding to FIGURE 6. Input potentials $e_{i6}$, $e_{i7}$ and $e_{i8}$ are linear functions of a parameter x in this example, as shown by the straight dashed lines in FIGURE 12. Using linear interpolating resistors $r_6$, $r_7$ and $r_8$, the output potential $e_o$ is given by the curve of segments ABEFGJK as follows from the above description, where ABC, respectively CFG, are parallel to $e_{i6}$, $e_{i7}$ and $ir_6$, $ir_7$ volts higher, and BEF, GJK are the interpolated segments.

Using now non-linear resistors for $r_m$ in the embodiment of FIGURE 6, such that their resistance for $i=i_m$ is equal to $r_m$, $$r_m=r_m(i);\ m=1,\ 2,\ \ldots$$

the output potential $e_o$ at 9 will not be altered in those domains which are produced by states of said embodiment in which only one diode conducts at a time, i.e. $e_o$ will follow AB, FG, FIGURE 12, as before. The [interploated] *interpolated* segments, however, will be altered. Thus BEF is replaced by the curved line BDF which lies above it, because in this region $D_6$ and $D_7$ conduct simultaneously and thus current i is divided between the paths through $r_6$ and $r_7$, and the currents through these two resistors, $i_6$ and $i_7$, respectively, are each smaller than i. $r_6(i_6)$ and $r_7(i_7)$ are therefore larger than $r_6$ and $r_7$, respectively, in this region, and the voltage drops along these resistors are therefore larger than they would have been with said nonlinear resistors replaced by $r_6$ and $r_7$, respectively. $e_o$ therefore follows curve BDF, FIGURE 12, rather than BEF. The amount of curvature of BDF above BEF depends upon the non-linear characteristics of interpolating resistances $r_6(i_6)$ and $r_7(i_7)$. If $r_6(0)=\infty$, BDF is tangential to ABC at B; similarly if $r_7(0)=\infty$, FDB is tangential to GFC at F—provided $r_6$, $r_7$ are continuous functions of $i_6$, $i_7$, respectively.

If no straight segments are required in the produced function of the function generator of this invention, the inputs can be so chosen that the straight sections of the output curve disappear. For example, referring to FIGURE 12, for FG to disappear, F and G must coincide, which can be achieved by replacing $e_{i8}$ by $e'_{i8}$, which is represented by a parallel line to $e_{i8}$ which passes through F. $r_8$ must now be sufficiently increased so that $e_o$ passes through K, as required by the function to be generated.

ABDFGHK, corresponding to the circuit of FIGURE 6, is a convex function. The circuit of FIGURE 5 similarly produces concave functions.

It is well known how functions that are neither wholly concave nor wholly convex can be produced by combinations of circuits producing respectively convex and concave functions. From the above description it will be quite clear how this invention applies to such cases.

Figure 13:
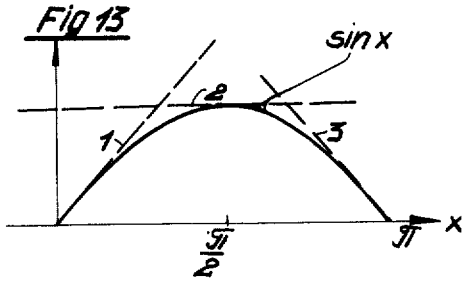
FIGURE 13 illustrates the first approximation of a half wave sine function by three straight lines.

As a specific example for the embodiment of FIGURE 6 I consider a generator for a sinusoidal function, sin $x$, in the range $0\ \ldots\ \pi$, where $x$ is the [independent] *independent* variable. FIGURE 13 is a plot of sin x versus x. A first approximation to this curve is given by lines 1, 2, 3 which are the tangents to sin x at $x=0$, $\pi/2$, $\pi$, respectively. An embodiment of this invention with three input terminals 6, 7, 8, will be given as an example. Without interpolating resistors, $e_o$ can be made to correspond to the convex piecewise-linear curve produced by lines 1, 2, 3, using a configuration corresponding to FIGURE 6 with the resistors shortened. Using suitable constant interpolating resistors, according to this invention, FIGURE 6 corresponds to a configuration which can approximate said function by five straight lines, i.e. by two additional straight lines. This invention further improves the approximation as described, using non-linear resistances $r_6$, $r_7$, and $r_8$. In this example parallel combinations of thyrite resistors and linear (i.e. constant) resistors are used for $r_6$, $r_7$ and $r_8$. Such a parallel combination is particularly convenient in order to obtain the required values for said interpolating resistances when traversed by current i. Having chosen a suitable non-linear re-resistance, the parallel constant resistance is adjusted so as to obtain the required resistance of said parallel combination when traversed by i. Said adjustment is usually required for each such parallel combination because of the comparatively large deviation from the average of thyrite resistors of the same type. The following values are used in one example:

$$i=1 \text{ milliampere}$$
$$e_{16}=2y-34.5 \text{ volts}$$
$$e_{17}=17.8 \text{ volts}$$
$$e_{18}=-2y+165.5 \text{ volts}$$

where $y=100x/\pi$, and $y=0 \ldots 100$ volts.

$r_6$ and $r_8$ are each a parallel combination of a thyrite VDR (voltage dependent resistor), type Philips E299DD/P216 in parallel with a linear resistor of 12.5 kilo-ohms, approximately; $r_7$ is a parallel combination of a thyrite VDR, type Philips E299DD/P218 in parallel with a linear resistor of 23.5 kilo-ohms, approximately.

The following output voltage is obtained:

$$e_o=63.3 \sin (\pi y/100)=63.3 \sin x$$

The characteristics of said VDR resistors are as follows:

$$E=Ci^{\beta}$$

where E is in volts and i in amperes; where C=25 and $\beta=0.21-0.30$ for E299DD/P216; and C=32 and $\beta=0.21-0.30$ for E299DD/P218.

Input voltages [$e_{16}$]$e_{i6}$ and [$e_{17}$]$e_{i7}$ may be limited to 70 volts, approximately, in this example. The diodes are silicon junction diodes, and the above input voltages to the function generator are corrected for the offset voltage of 0.6 volt, approximately, of said diodes.

The diodes used in embodiments of this invention such as those corresponding to FIGURES 5, 6 and 7, for example, may be omitted if only the range of variables corresponding to a segment such as BDF, FIGURE 12, is to be produced in the function generator. The function generator has only two input terminals in this case, such as 1 and 2, FIGURES 5 and 7, and said diodes are not required because in said range both $r_1$ and $r_2$ always conduct some current. Such an embodiment of this invention, using no diodes, may be operated even beyond the *segment* BDF. Output voltage $e_o$ will then follow a curve which lies above BA for values of x smaller than its value at B, and above FG for values of x larger than its value at F. When such an output characteristic is required this modification of the invention may be applied to advantage.

Similarly, in a function generator of configurations corresponding to FIGURE 5 and having 3 input terminals 1, 2 and 3, it is sometimes [possibe] *possible* to omit diode $D_2$ if in all the required states of said function generator $r_2$ must conduct some current. Equivalent relations and modifications apply to embodiments of this invention corresponding to FIGURE 6.

Although this invention has been described and illustrated in detail it is to be clearly understood that the same is by way of illustration and example only and is not to be taken by way of limitation, the scope of this invention being limited only by the terms of the appended claims.

What is claimed is:

1. A function generator for generating a function of one or more variables, including a plurality of input means for accepting a plurality of input signals that represent suitable functions of said variables; a plurality of diode means and a plurality of suitable interpolating non-linear resistance means each for connecting a respective one of said input means to an associated diode means; said plural diode means having a common output connection for producing at said output connection a signal representing a suitable function for the instantaneous values of said variables; constant current means connected to said common output connection for withdrawing current from at least one of said interpolating resistance means; each of said interpolating resistance means having resistive values to cause at least two of said diode means to conduct simultaneously; said constant current means being adapted to withdraw all of the current flowing in any of said diode means at any given instant causing said non-linear resistive means to operate in a substantially linear manner when only one of said diode means is conducting at any given instant and to cause said non-linear resistance means to operate in a non-linear manner when two of said diode means are conducting simultaneously.

2. A *function* generator for generating a [piecewise-linear] function of one or more variables including a plurality of input means for accepting a plurality of input signals which represent suitable linear functions of said variables; a plurality of suitable non-linear interpolating resistance means *responsive to said signals* and a plurality of diode means *connected to said resistance means* [with] *having a* common output connection for producing from said input signals at said output connection an output signal corresponding to the instantaneous values of said variables, such that said output signal is composed of a plurality of *linear* domains in each of which it is a *substantially* linear function of said variables, [one domain] each *of said linear domains* being produced through the conduction of *only* one of said diode means [additional domains being] *and at least one non-linear domain wherein said output signal is a non-linear function of said variables* produced through simultaneous conduction of two or more of said diode means, [constant] current means connected to said common connection for [withdrawing] *supplying* current [from] *thereto the magnitude whereof is substantially independent of the potential of said common connection;* [from at least one of said interpolating resistance means] said [constant] current means being adapted to *supply* [withdraw] all of the current flowing *through said common connection into* [in] any of said diode means at any given instant causing said non-linear resistance means to operate in a substantially linear manner when only one [branch] of said diode means is conducting at any given instant and [to cause] *causing* said non-linear resistance means to operate in a non-linear manner when two of said diode means are conducting simultaneously.

3. The device as recited in claim 1 in which said *current* means [for injection or withdrawal of current] comprises resistance means connecting said common connection to constant potential means.

4. The device as recited in claim 1, including additional diode means connected to said common connection for the compensation of diode drift.

5. A function generator for generating a function of one or more variables, including a plurality of input means for accepting a plurality of input signals that represent suitable functions of said variables and a plurality of suitable non-linear interpolating resistance means, a plurality of unilateral conducting means connected to said resistance means having a common output connection, for producing at said common output connection a signal representing a suitable function for the instantaneous values of said variables, constant current means connected to said common output connection for withdrawing current from at least one of said interpolating resistance means; said unilateral conducting means comprising transistor means in common collector connection, said interpolating resistance means being connected between the emitters of said transistor means and said common output connection, the base electrodes of said transistors being adapted to receive said [linear] input signals.

*6. A function generator for generating a function of one or more variables, including a plurality of input means for accepting a plurality of input signals that rep-*

*resent suitable functions of said variables; first and second non-linear interpolating resistance means having a common output connection connected to respective ones of said input means for producing at said common connection a signal representing said function; current means connected to said common connection for supplying a current thereto, the magnitude of said current being substantially independent of the potential of said common connection, said current means being adapted to supply all of the current flowing through said common connection into said resistance means at any given instant to cause said resistance means to be simultaneously supplied with current through said common connection for suitable values of said variables.*

*7. The device as recited in claim 6 wherein one of said functions is a constant, including constant potential means the input means associated with said constant function being connected thereto.*

*8. A function generator for generating a function of one or more variables, including a plurality of input means for accepting a plurality of input signals that are suitable functions of said variables; a plurality of conductive branches having a common output connection each connected to a respective one of said input means wherein each branch includes non-linear interpolating resistance means, at least one of said branches includes diode means, current means connected to said common connection for supplying a current thereto, the magnitude of said current being substantially independent of the potential of said common connection, said current means being adapted to supply all of the current flowing through said common connection into said resistance means at any given instant to cause at least two of said resistance means to be simultaneously supplied with current through said common connection for suitable values of said variables.*

*9. The device as recited in claim 8 wherein one of said functions is constant, including constant potential means the input means associated with said constant function being connected thereto.*

*10. The device as recited in claim 8 wherein each of said branches is composed of a series connected combination of a respective one of said non-linear resistance means and diode means.*

*11. The device as recited in claim 10 wherein one of said functions is constant, including constant potential means the input means associated with said constant function being connected thereto.*

References Cited by the Examiner

The following references, cited by the Examiner, are of record in the patented file of this patent or the original patent.

Galli: How Diodes Generate Functions, Control Engineering, March 1959, pages 109–113.

Ritchie et al: The Design of Biased Diode Function Generators, Electronic Engineering, June 1959, pages 347–351.

Kovach et al: Nonlinear Transfer Functions with Thyrite, I.R.E. Trans. on Electronic Computers, June 1958, pp. 91–96.

MALCOLM A. MORRISON, *Primary Examiner.*

A. J. SARLI, *Assistant Examiner.*